United States Patent
Mauser et al.

Patent Number: 6,152,545
Date of Patent: Nov. 28, 2000

[54] ARRANGEMENT FOR AVOIDING AN UNDESIRED BRAKING OPERATION OF AN ELECTRONIC BRAKE IN A VEHICLE

[75] Inventors: Hans Mauser, Munich; Erwin Thurner, Planegg, both of Germany

[73] Assignee: Siemens Aktiengesellschaft, Munich, Germany

[21] Appl. No.: 09/162,177

[22] Filed: Sep. 28, 1998

[30] Foreign Application Priority Data

Sep. 30, 1997 [DE] Germany .............. 197 43 305

[51] Int. Cl.$^7$ .................. B60T 13/66
[52] U.S. Cl. ...................... 303/20
[58] Field of Search .............. 180/65.1, 65.5; 303/20, 152; 701/92, 97; 188/158, 159; 364/426.021

[56] References Cited

U.S. PATENT DOCUMENTS

| | | | |
|---|---|---|---|
| 4,414,631 | 11/1983 | Schug | 364/426 |
| 5,125,483 | 6/1992 | Kitagawa et al. | 188/158 |
| 5,352,028 | 10/1994 | Eccleston | 303/20 |
| 5,957,551 | 9/1999 | Maron et al. | 303/191 |
| 5,961,190 | 10/1999 | Brandmeier et al. | 303/152 |
| 6,033,042 | 3/2000 | Klemen | 303/152 |

FOREIGN PATENT DOCUMENTS

| | | |
|---|---|---|
| 0 486 281 | 5/1992 | European Pat. Off. . |
| 0 519 179 | 12/1992 | European Pat. Off. . |
| 35 02 100 | 7/1986 | Germany . |
| 196 25 104 | 1/1996 | Germany . |
| 195 48 392 A1 | 3/1997 | Germany . |
| 195 48 392 | 7/1997 | Germany . |

*Primary Examiner*—Chris Schwartz
*Attorney, Agent, or Firm*—Hill & Simpson

[57] ABSTRACT

In an electronic brake of a vehicle, it is to be prevented that an actuator that is arranged on each wheel of the vehicle and that comprises a self-locking mechanism effects an undesired continuous blocking of the wheel. For this purpose, an energy storage unit is arranged directly at the actuator, which, on the basis of a suitable control mechanism, ensures the release of the actuator for the respective wheel in case of failure of the current supply. In addition, given a changeover to such an emergency operation, the supply line is interrupted on the basis of a controlled switch, in order to ensure release of the actuator even in the case of a short-circuit.

11 Claims, 2 Drawing Sheets

ARRANGEMENT FOR AVOIDING AN UNDESIRED BRAKING OPERATION OF AN ELECTRONIC BRAKE IN A VEHICLE

BACKGROUND OF THE INVENTION

Field of the Invention

The invention relates to an arrangement for avoiding an undesired braking operation of an electronic brake of a vehicle. From DE 195 48 392 A1, a braking apparatus is known for a vehicle having four electrically controlled wheel braking units. Activated via the brake pedal, wheels can be actuated independently of one another. Even in the case of failure of individual wheel brakes, the vehicle is thus securely braked. Separate electrical control circuits are provided for each pair of wheel brakes, which both receive separate control signals from a braking force simulator, and each comprise a separate energy supply circuit.

In an electronic brake (preferably in connection with a self-locking mechanism as a braking actuator) it is to be avoided that a current failure provides continued existence of the braking action on a wheel of the vehicle. A wheel blocked in this way makes a controlled steering of the vehicle considerably more difficult.

SUMMARY OF THE INVENTION

An object of the invention is to avoid an undesired braking operation of an electronic brake ("brake-by-wire") of a vehicle.

According to the present invention, an arrangement is provided for avoiding an undesired braking operation of an electronic brake of a vehicle. An actuator exerts a braking action on a wheel of the vehicle. A current supply supplies current to the actuator. An energy storage unit is charged via the current supply. The changeover switch switches over the energy storage unit when there is an interruption of the current supply so that the actuator is supplied with current and the actuator is reset into a state in which it exerts no braking action on the wheel.

The invention indicates an arrangement for avoiding an undesired braking operation of an electronic brake of a vehicle. This arrangement comprises an actuator that exerts a braking action on a wheel of the vehicle. In addition, a current supply is provided that supplies the actuator with energy. An energy storage unit is also provided that is charged via the current supply. Finally, a changeover switch is provided that connects the energy storage unit when there is an interruption of the current supply, so that it supplies the actuator with current and so that the actuator is reset into a state in which it does not exert a braking action on the wheel.

It is an essential advantage of the invention that by means of the energy storage unit a resetting of the actuator is ensured, thus ensuring that when there is a failure of the current supply for this actuator, no single blocking wheel makes the vehicle uncontrollable. Preferably, suitable measures are taken in case the current supply for one wheel of the vehicle fails, e.g. immediate halting of the vehicle or continued travel only at a significantly reduced speed. Nonetheless, a car (normally with four wheels) with three functioning actuators that respectively exert a braking action on a wheel, i.e. with three braking wheels, can still be brought safely to a stop, even if the braking path is lengthened somewhat.

A development of the invention is that the actuator comprises a self-locking mechanism.

Precisely in this case, it is important that the energy storage unit provide sufficient energy for the resetting of the actuator for which the current supply has failed. The wheel, which in normal operation is braked by the actuator whose current supply has failed, is not braked until the restoration of the current supply. It runs freely, and thus does not block. By this technique, the vehicle remains controllable, and, as mentioned above, can be braked (with a delay) on the basis of the remaining functioning actuators.

In a development of the invention, the self-locking mechanism can be a spindle.

Another development is that the changeover switch is a relay. With the relay, the changeover to the energy storage unit can be produced as an "emergency current supply." In normal operation, current flows through e.g. the primary circuit of the relay, the controlled secondary circuit is interrupted, and the energy storage unit is charged or kept charged. If the current supply breaks off, i.e. the flow of current in the primary circuit stops, the interruption can be terminated in the secondary circuit. The energy storage unit is no longer charged; instead, the energy storage unit now supplies the actuator with electrical energy. The quantity of energy in the energy storage unit can thereby be dimensioned in such a way that in the idle state (without exerting a braking action on the wheel), the actuator is displaced, or is controlled in the idle state via a control unit.

It is also a development of the invention that the changeover switch is a microcontroller. In principle, the microcontroller thereby provides the same functionality as the relay described above. If the current supply is interrupted, a predetermined action is carried out; in particular, the actuator moves into the idle state. In addition, the microcontroller can control the actuator, i.e. monitor the movement into the idle state or convert braking commands also for normal operation with the aid of the actuator, via a control line provided specifically therefor. In this way, the functionality of the microcontroller can be expanded to the controlling of the actuator even in normal operation, whereby given an interruption of the current supply, this is noticed by the microcontroller, and a changeover to the energy storage unit is carried out thereupon. Via the microcontroller, a message to the driver of the vehicle can also take place concerning the failure of the current supply for the relevant actuator. A supplying of the microcontroller with energy can likewise take place via a combination of the current supply and/or the energy storage unit, whereby an accumulator can in addition be provided for the microcontroller, which keeps ready a corresponding reserve energy supply for the microcontroller. Since nowadays a microcontroller requires only small quantities of electrical energy for its operation, the reserve energy supply can be dimensioned correspondingly small, or the microcontroller can be operated for a correspondingly long period of time with a sufficiently large reserve energy supply.

It is also a development of the invention that the energy storage unit is arranged in a housing together with the actuator.

In addition, the changeover switch can also be arranged in this housing.

With the realization of the energy storage unit, the actuator and the changeover switch in one housing, the short-path design, i.e. correspondingly short supply lines and thus lower susceptibility to error of the supply lines, is supposed to be further improved. If the energy storage unit were arranged at a great distance from the actuator, a monitoring of the supplying by the energy storage unit could be provided, which could in turn be monitored. In order to circumvent this, the energy storage unit is attached as directly as possible at the actuator, so that there is no excessively long line to be monitored from the energy storage unit to the actuator. The changeover switch is advantageously likewise arranged near the actuator, in order to avoid long paths (large stretches of cable) and, if warranted, to enable a supply of current to the changeover switch via the energy storage unit as well (without a long cable). It is also a reason for the location of the energy storage unit to the actuator that in normal operation as well, high currents are required for braking, and the probability of e.g. cable burning or contact problems is thus reduced.

In an additional development, the energy storage unit is an electrolytic capacitor or an accumulator.

Numerous possible embodiments are conceivable for electrical energy storage units. One possibility is a sufficiently large electrolytic capacitor (Elko). In this way, it can be achieved that the energy of the energy storage unit is sufficient to move the actuator into the idle state.

Another possible realization of an energy storage unit is presented by an accumulator (AKKU; rechargeable energy storage unit). This accumulator is to be dimensioned in a manner corresponding to a specific application. If the actuator is to be moved into the idle state, for the storing of a smaller quantity of electrical energy it can be designed as if an additional action, e.g. the additional supplying of a microcontroller over a predeterminable period of time, is to be carried out.

On the basis of the following figures, embodiments of the invention are presented in more detail.

DESCRIPTION OF THE PREFERRED EMBODIMENTS

Figure 1:
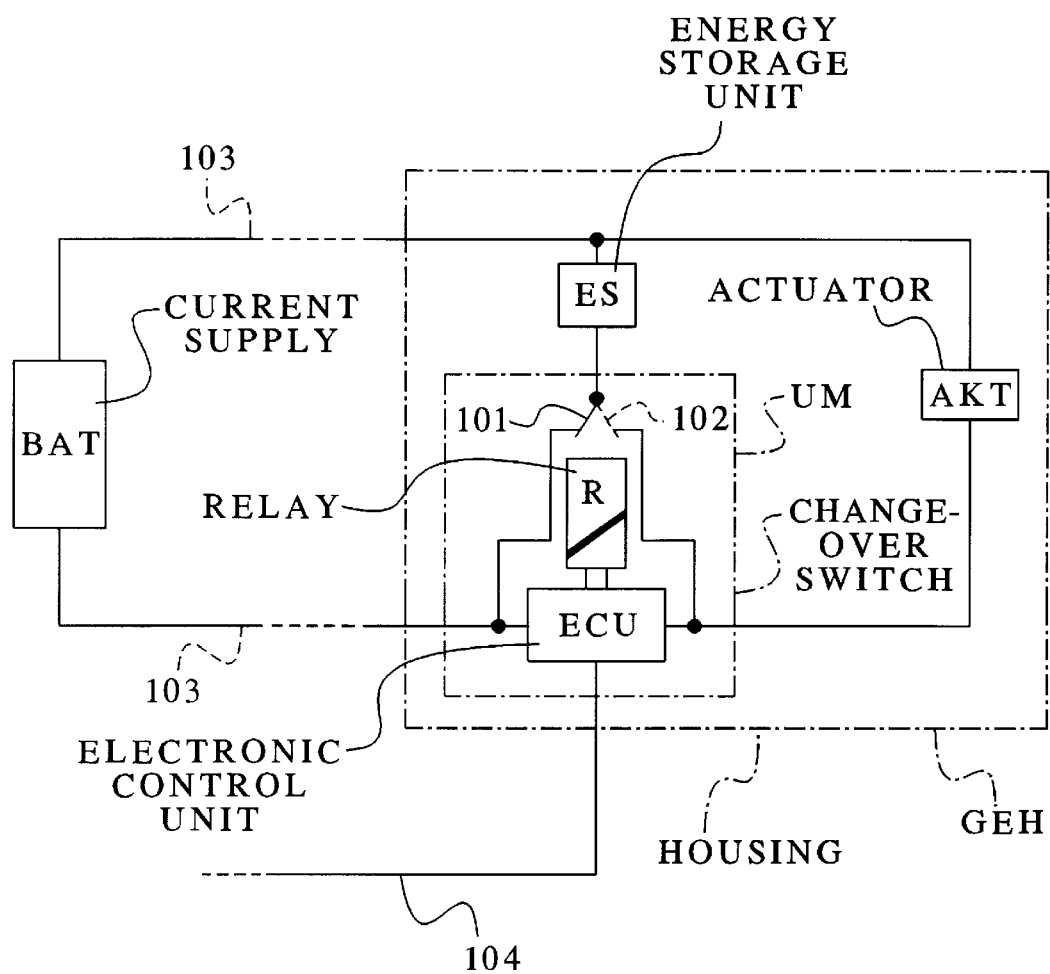
FIG. 1 shows a drawing with an arrangement for avoiding an undesired braking operation of an electronic brake of a vehicle.

FIG. 1 shows a current supply BAT (also: on-board network), preferably a car battery of a motor vehicle, which is connected with a housing GEH via the two current supply lines 103. The two current supply lines 103 represent an error-susceptible region for an interruption.

As soon as one of the two current supply lines is interrupted, then (without the invention) the actuator AKT no longer has any electrical energy enabling exertion of a braking force on a wheel of the vehicle, or the actuator AKT is no longer released if the current supply BAT fails exactly at a moment of braking. This has fatal consequences, since the vehicle can no longer be maneuvered if a wheel is blocked.

Aid is provided by an energy storage unit ES and a changeover switch UM, as shown in FIG. 1. In normal operation, the energy storage unit ES is charged via the switch 101, and a control unit ECU (Electronic Control Unit) ensures that the actuator AKT is driven corresponding to a braking signal 104. If the supply line 103 to the current supply BAT is now interrupted, a changeover takes place from charge operation 101 to supply operation 102 via the relay RS of the energy storage unit ES. The control unit ECU also notices the interruption of the current supply BAT and drives the actuator AKT with the energy from the energy storage unit ES in such a way that the actuator AKT is reset into a state in which it no longer exerts a braking force on the wheel. The vehicle wheel that is to be braked by the actuator AKT, whose current supply BAT is interrupted, rotates freely, without braking action. Via the remaining wheels or wheel of the vehicle, and thus by means of the actuators belonging to these wheels, the vehicle can be brought to a stop, even without the wheel without the braking action.

An energy storage unit ES is preferably arranged at each actuator AKT, with a changeover switch UM of the current supply BAT to the energy storage unit ES, in a housing GEH provided therefor.

Figure 2:
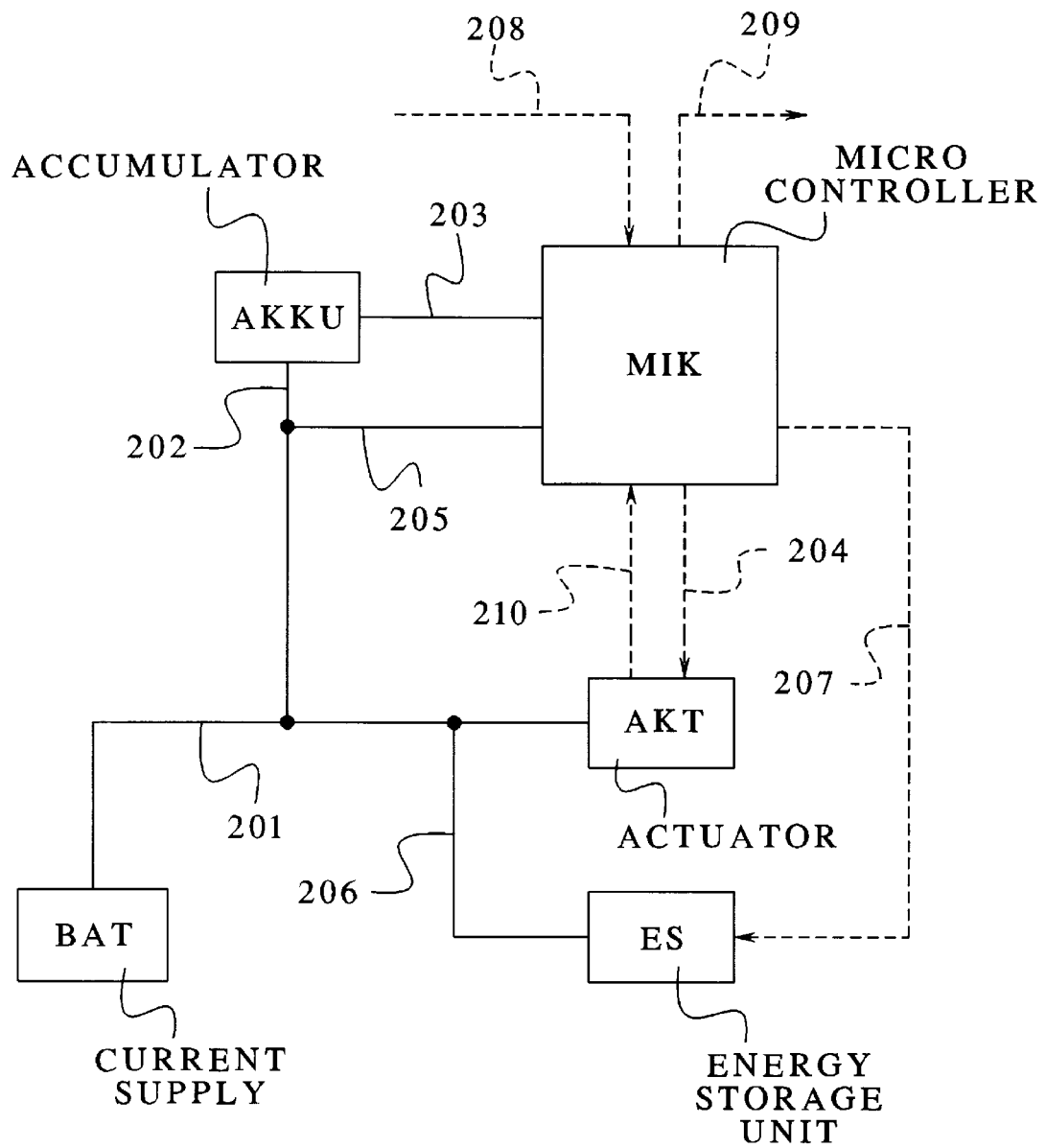
FIG. 2 shows a block switching diagram having a microcontroller for avoiding an undesired braking operation of an electronic brake of a vehicle.

In FIG. 2, the functionality represented above is realized on the basis of a microcontroller MIK. Solid lines indicate current supplies and broken lines indicate control lines.

In normal operation, the current supply BAT supplies current to the actuator AKT via a line 201, simultaneously charges the energy storage unit ES via a line 206, charges an accumulator AKKU reserved separately for the microcontroller via a line 202, and operates the microcontroller MIK via a line 205.

The microcontroller MIK controls the actuator AKT via a line 204 and receives a correspondingly predetermined acknowledgment from the actuator AKT via a line 210. Examples of contents of such acknowledgments include the current position or functional readiness of the actuator AKT.

Via a line 208, a braking command is communicated to the microcontroller MIK, which forwards the command to the actuator AKT via the line 204. Via a line 209, the microcontroller MIK preferably communicates diagnostic data to a central vehicle computer.

If the supply line 201 to the current supply BAT of the vehicle fails (failure operation), the actuator AKT can no longer be supplied, the accumulator AKKU and the energy storage unit ES are no longer charged, and the microcontroller MIK is no longer fed via the current supply BAT.

The energy supply for the microcontroller MIK changes over automatically to the accumulator AKKU provided therefor, the accumulator suppling the microcontroller MIK via a line 203.

Via a line 207, the microcontroller MIK effects a changeover of the energy storage unit ES from charge operation to supply operation. The energy storage unit thus ensures the supply of energy to the actuator via the line 206. Via the line 204, the microcontroller MIK now effects a resetting of the actuator AKT. An acknowledgment of the corresponding resetting of the actuator AKT is monitored by means of the line 210. Finally, via the line 209 the microcontroller MIK sends a corresponding failure message to the central vehicle computer, whereby the status (ok, error) of the relevant actuator and the current position (released, partially released, fixed) are preferably transmitted.

Since in failure operation it is ensured that the actuator AKT is released, but is not again applied, after the failure of the current supply BAT and the execution of the above-described processes for failure operation, both the accumulator AKKU for the operation of the microcontroller MIK and also the energy storage unit ES are slowly discharged. A central vehicle computer is preferably informed of the failure and the relevant actuator AKT is released, i.e., no braking action is exerted on the wheel whose actuator AKT has failed. The vehicle can be brought to a stop on the basis of the remaining actuators for the remaining wheels.

In addition, it is possible without limitation that the accumulator AKKU for the microcontroller MIK and the energy storage unit ES are realized as a unit.

In order to prevent a short-circuit of the supply line 201 from causing a short-circuit of the energy storage unit ES and the accumulator AKKU, in failure operation the current supply BAT is disconnected. In this way, it is avoided that a short-circuit at or in the current supply BAT or the supply line 201 will have an effect on the failure operation components accumulator AKKU, energy storage unit ES, microcontroller MIK and actuator AKT. The microcontroller MIK can provide such a physical interruption of the supply line 201 by decoupling the supply line 201 from the respective failure operation components after failure operation has been noticed. This preferably takes place by means of an electronic switch that is driven via the microcontroller MIK and that interrupts the supply line 201 in failure operation.

Although various minor modifications might be suggested by those skilled in the art, it should be understood that it is our wish to embody within the scope of the patent warranted hereon all such modifications as reasonably and properly come with the scope of our contribution to the art.

We claim as our invention:

1. An arrangement for avoiding an undesired braking operation of an electronic brake of a vehicle, comprising:
    an actuator for exerting a braking action on a wheel of the vehicle;
    a current supply for supplying current to the actuator;
    an energy storage unit for being charged via the current supply; and
    a changeover switch for switching over the energy storage unit when there is an interruption of the current supply so that the actuator is supplied with current and the actuator is reset into a state in which it exerts no braking action on the wheel.

2. The arrangement according to claim 1 wherein the actuator comprises a self-locking mechanism.

3. The arrangement according to claim 2 where the self-locking mechanism comprises a self-locking spindle.

4. The arrangement according to claim 1 wherein the changeover switch comprises a relay.

5. The arrangement according to claim 1 wherein the changeover switch comprises a microcontroller.

6. The arrangement according to claim 1 wherein the energy storage unit is arranged in a housing with the actuator.

7. The arrangement according to claim 1 wherein the changeover switch is arranged in a housing with the actuator.

8. The arrangement according to claim 1 wherein the changeover switch is arranged in a housing with the energy storage unit.

9. The arrangement according to claim 1 wherein the energy storage unit comprises an electrolytic capacitor.

10. The arrangement according to claim 1 wherein the energy storage unit comprises an accumulator.

11. An arrangement for avoiding an undesired braking operation of an electronic brake of a vehicle, comprising:
    an actuator for exerting a braking action on a wheel of the vehicle;
    a current supply connected to supply current to the actuator;
    an energy storage unit connected to the current supply by a changeover switch; and
    said changeover switch switching over connection of the energy storage unit to the actuator when there is an interruption of the current supply so that the actuator is supplied with current, from the energy storage unit so that the actuator is reset into a state in which it exerts no braking action on the wheel.

* * * * *